(12) United States Patent
Kim (10) Patent No.: US 12,304,341 B2
(45) Date of Patent: May 20, 2025

(54) VEHICLE WITH CHARGING PROGRESS NOTIFICATION AND METHOD OF CONTROLLING THE SAME

(71) Applicants: Hyundai Motor Company, Seoul (KR); Kia Corporation, Seoul (KR)

(72) Inventor: Youngbeom Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 692 days.

(21) Appl. No.: 17/490,832

(22) Filed: Sep. 30, 2021

(65) Prior Publication Data

US 2022/0203859 A1 Jun. 30, 2022

(30) Foreign Application Priority Data

Dec. 28, 2020 (KR) .................. 10-2020-0185009

(51) Int. Cl.
*B60L 53/62* (2019.01)
*B60L 53/66* (2019.01)
*B60L 53/30* (2019.01)

(52) U.S. Cl.
CPC ............ *B60L 53/62* (2019.02); *B60L 53/665* (2019.02); *B60L 53/305* (2019.02); *B60L 2250/10* (2013.01); *B60L 2250/22* (2013.01)

(58) Field of Classification Search
CPC ...... B60L 53/62; B60L 53/665; B60L 53/305; B60L 2250/10; B60L 2250/22
See application file for complete search history.

(56) References Cited

U.S. PATENT DOCUMENTS 9,229,905 B1 * 1/2016 Penilla .................. G06Q 20/18

* cited by examiner

*Primary Examiner* — Robert Grant
(74) *Attorney, Agent, or Firm* — Fox Rothschild LLP (57) ABSTRACT

A vehicle is capable of preventing unnecessary noise from being generated by outputting a sound for guiding a charging progress state only when a user can listen to the sound output from the vehicle. The vehicle includes a charging management system configured to output an electrical signal corresponding to a charging progress state of the vehicle; a sound output system configured to output a sound corresponding to the electrical signal output from the charging management system in an active mode and not output the sound in an inactive mode; and a controller configured to determine a position of a user device based on a communication signal transmitted from the user device, and to change an operation mode of the sound output system to the inactive mode based on the user device being located outside a preset range.

20 Claims, 8 Drawing Sheets

VEHICLE WITH CHARGING PROGRESS NOTIFICATION AND METHOD OF CONTROLLING THE SAME

CROSS-REFERENCE TO RELATED APPLICATION(S)

This application claims under 35 U.S.C. § 119 the benefit of Korean Patent Application No. 10-2020-0185009, filed on Dec. 28, 2020, the entire contents of which are incorporated herein by reference.

BACKGROUND

1. Technical Field

The disclosure relates to a vehicle configured to provide a notification of a charging progress state of the vehicle using a sound, and a method of controlling the vehicle.

2. Description of the Related Art

Vehicles may be classified into internal combustion engine-driven vehicles, hybrid electric vehicles, and battery electric vehicles according to a type of a power source generating a driving force. The internal combustion engine-driven vehicles are types of vehicle that generates power by burning fossil fuels such as gasoline, and are currently the most commonly used type of vehicle. In order to solve a problem of depletion of fossil fuels used as fuel for the internal combustion engine-driven vehicles and environmental pollution, the hybrid electric vehicles and the battery electric vehicles have been developed and their numbers are gradually increasing.

Unlike the internal combustion engine-driven vehicles that use fossil fuels as their main energy source, the electric vehicles use electric energy as their main energy source. Accordingly, the electric vehicles must necessarily include a high voltage battery capable of storing electric energy, a motor as the power source, and an inverter for driving the motor.

In order to charge a battery of the electric vehicle, the user needs to connect an external charger to a charging port of the vehicle, and the vehicle may guide a current charging progress state of the vehicle using a display.

SUMMARY

An aspect of the disclosure is to provide a vehicle that outputs a sound for guiding a charging progress state only when a user can hear the sound output from the vehicle, and a method of controlling the vehicle.

Additional aspects of the disclosure will be set forth in part in the description which follows and, in part, will be obvious from the description, or may be learned by practice of the disclosure.

According to an aspect of the disclosure, there is provided a vehicle including: a charging management system configured to output an electrical signal corresponding to a charging progress state of the vehicle; a sound output system configured to output a sound corresponding to the electrical signal output from the charging management system in an active mode and not output the sound in an inactive mode; and a controller configured to determine a position of a user device based on a communication signal transmitted from the user device, and to change an operation mode of the sound output system to the inactive mode based on the user device being located outside a preset range.

The charging progress state may include at least one of a charger connection state, a charging start state, a charging end state, a reserved charging start state, a reserved charging standby state, or a charging failure state.

Based on a charger being connected to a charging port of the vehicle, the controller may be configured to set the operation mode of the sound output system to the active mode.

Based on a detection of an unlock signal of a door, the controller may be configured to set the operation mode of the sound output system to the active mode.

Based on detecting an unlock signal of a charging door, the controller may be configured to set the operation mode of the sound output system to the active mode.

Based on the user device being located within a preset range, the controller may be configured to change the operation mode of the sound output system to the active mode.

The vehicle may further include a sensor configured to obtain information about a surrounding environment of the vehicle. Based on detecting an object in a vicinity of the vehicle through the sensor, the controller may be configured to communicate with the user device.

Based on detecting a rising edge or a falling edge of the electrical signal output from the charging management system, the sound output system may be configured to output the sound corresponding to the electrical signal.

Based on changing from the inactive mode to the active mode, the sound output system may be configured to output the sound corresponding to the electrical signal output from the charging management system.

The vehicle may further include a telematics terminal. The charging management system may be configured to output the electrical signal corresponding to the charging progress state of the vehicle based on establishing a communication between the external terminal device and the telematics terminal.

According to another aspect of the disclosure, there is provided a method of controlling a vehicle, the vehicle including a charging management system configured to output an electrical signal corresponding to a charging progress state of the vehicle; and a sound output system configured to output a sound corresponding to the electrical signal output from the charging management system in an active mode and not output the sound in an inactive mode. The method including: determining, by a controller, a position of a user device based on a communication signal transmitted from the user device; and changing, by the controller, an operation mode of the sound output system to the inactive mode based on the user device being located outside a preset range.

The charging progress state may include at least one of a charger connection state, a charging start state, a charging end state, a reserved charging start state, a reserved charging standby state, or a charging failure state.

The method may further include, based on a charger being connected to a charging port of the vehicle, setting, by the controller, the operation mode of the sound output system to the active mode.

The method may further include, based on a detection of an unlock signal of a door, setting, by the controller, the operation mode of the sound output system to the active mode.

The method may further include, based on detecting an unlock signal of a charging door, setting, by the controller, the operation mode of the sound output system to the active mode.

The method may further include, based on the user device being located within a preset range, changing, by the controller, the operation mode of the sound output system to the active mode.

The method may further include, based on detecting an object in a vicinity of the vehicle, communicating, by the controller, with the user device.

The method may further include, based on detecting a rising edge or a falling edge of the electrical signal output from the charging management system in the active mode, outputting, by the sound output system, the sound corresponding to the electrical signal.

The method may further include, based on changing from the inactive mode to the active mode, outputting, by the sound output system, the sound corresponding to the electrical signal output from the charging management system.

The method may further include, outputting, by the charging management system, the electrical signal corresponding to the charging progress state of the vehicle based on establishing a communication between the external terminal device and the telematics terminal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals refer to like elements throughout the specification. Not all elements of the embodiments of the disclosure will be described, and the description of what are commonly known in the art or what overlap each other in the exemplary embodiments will be omitted.

It will be further understood that the term "connect" and its derivatives refer both to direct and indirect connection, and the indirect connection includes a connection over a wireless communication network.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 1:
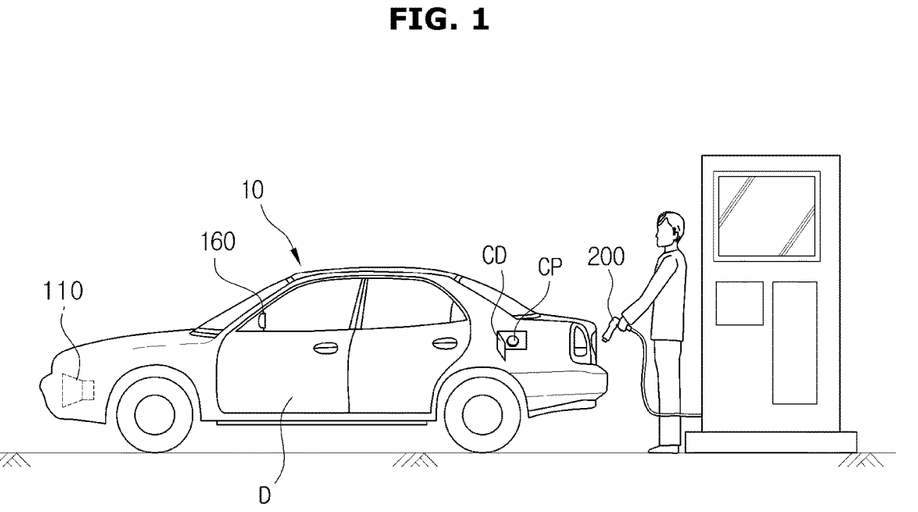
FIG. 1 is a view illustrating an exterior of a vehicle according to an embodiment.
Figure 2:
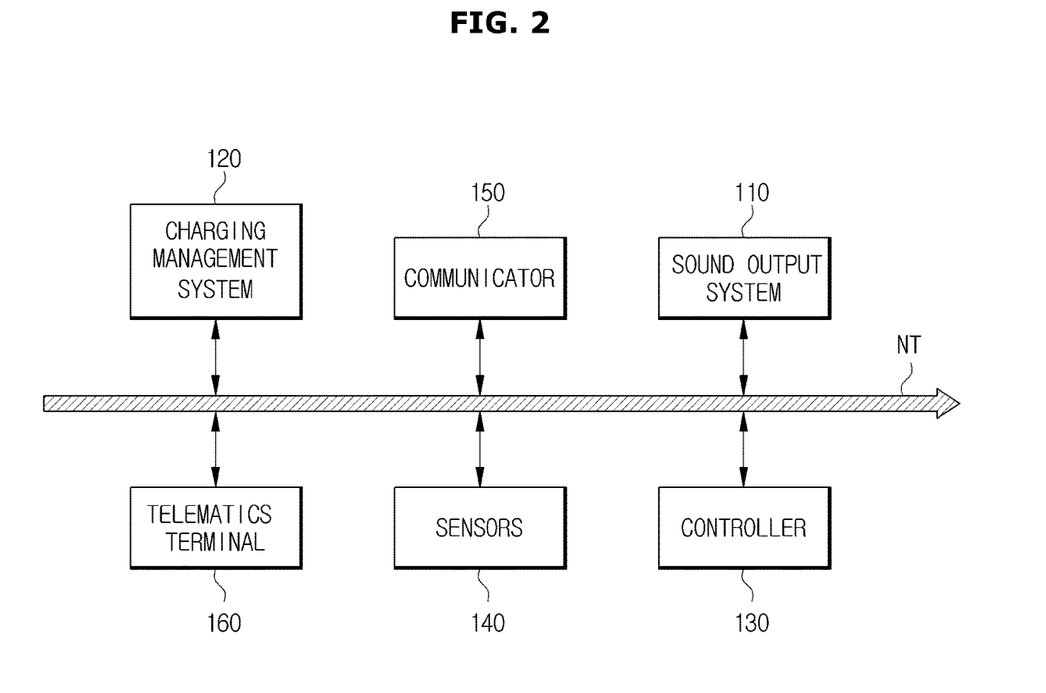
FIG. 2 is a control block diagram of a vehicle according to an embodiment.

FIG. 1 is a view illustrating an exterior of a vehicle according to an embodiment, and FIG. 2 is a control block diagram of a vehicle according to an embodiment.

Referring to FIG. 1, a vehicle 10 may include a sound output system 110 for outputting a sound corresponding to a charging progress state, a door D, a charging port CP, and a charging door CD for protecting the charging port CP from the outside.

The vehicle 10 may include a motor driven by electricity, and may correspond to an electric power vehicle that obtains power using a motor.

In this case, the electric power vehicle may include a battery electric vehicle (BEV), a hybrid electric vehicle (HEV), a plug-in hybrid vehicle (Plug-in HEV), and the like, and may include without limitation any type of vehicle that obtains power from the motor.

The sound output system 110 may include a memory storing a plurality of sound source data, a speaker for converting the plurality of sound source data into a sound wave form and outputting it, and a processor for selecting any one sound source data from among the plurality of sound source data stored in the memory and transmitting the selected sound source data to the speaker.

As an example, the sound output system 110 may include a virtual engine sound output system provided in a body of the vehicle 10 to output the virtual engine sound to the outside of the vehicle 10.

The door D may separate the inside and the outside of the vehicle 10 and may be opened and closed by a user.

The vehicle 10 may include a door locking device capable of locking the door D. The door lock device may lock the door D when receiving a lock signal of the door D, and unlock the door D when receiving an unlock signal of the door D.

The charging port CP is electrically connected to a charger 200, and may receive power or various information from the charger 200.

For example, the charger 200 and the vehicle 10 may perform a power line communication through the charging port CP.

The charging door CD may block the charging port CP from the outside to prevent foreign substances from entering the charging port CP, and may be opened or closed by the user directly or may be opened in response to receiving the unlock signal of the charging door CD.

Referring to FIG. 2, the vehicle 10 may further include a charging management system 120, a controller 130, sensors 140, a communicator 150, and a telematics terminal 160.

The sound output system 110, the charging management system 120, the controller 130, the sensors 140, the communicator 150, and the telematics terminal 160 may be communicatively coupled to each other to transmit/receive various types of information and/or data.

For example, the sound output system 110, the charging management system 120, the controller 130, the sensors 140, the communicator 150, and the telematics terminal 160 may communicate with each other through a vehicle communication network NT, but are not limited thereto, and various communication methods may be employed.

The vehicle communication network NT may employ a communication protocol such as MOST (Media Oriented Systems Transport) having a communication speed of up to 24.5 Mbps (Mega-bits per second), FlexRay having a communication speed of up to 10 Mbps, CAN (Controller Area Network) having a communication speed of 125 kbps (kilobits per second) to 1 Mbps, and LIN (Local Interconnect Network) having a communication speed of 20 kbps. The vehicle communication network NT may employ a single communication protocol such as MOST, FlexRay, CAN, and LIN, as well as a plurality of communication protocols.

The charging management system 120 may determine the charging progress state of the vehicle 10 based on information received from various components of the vehicle 10 through the vehicle communication network NT or other communication method.

As an example, the charging management system 120 may determine the charging progress state of the vehicle 10 based on information of the charger 200 received through the charging port CP, reserved charging information received through the telematics terminal 160 and/or a head unit of the vehicle 10, etc.

For this purpose, the charging management system 120 may include at least one memory in which a program for performing the above-described operation and an operation to be described later is stored, and at least one processor for executing the stored program.

In addition, the charging management system 120 may output an electrical signal corresponding to the charging progress state of the vehicle 10. As an example, the charging management system 120 may transmit the electrical signal corresponding to the charging progress state of the vehicle 10 to the sound output system 110.

The charging management system 120 may receive the power from an IG3 power supply module. The IG3 power supply module may refer to a module for supplying power to a charging circuit using a large-capacity battery, a power supply device, a convenience device, and a safety device in addition to an ACC power supply, an IG1 power supply, and an IG2 power supply.

The sound output system 110 may output the sound corresponding to the electrical signal output from the charging management system 120.

In addition, the sound output system 110 may operate in an active mode for outputting the sound corresponding to the electrical signal output from the charging management system 120 and an inactive mode that does not outputting the sound.

That is, the sound output system 110 may output the sound corresponding to the electrical signal output from the charging management system 120 in the active mode, and may be configured not to output the sound in the inactive mode.

For example, in the inactive mode, the sound output system 110 may ignore the electrical signal output from the charging management system 120.

The controller 130 may control various components in the vehicle 10 based on information received through the vehicle communication network NT and/or information received through other communication methods.

For example, the controller 130 may change an operation mode of the sound output system 110 based on position information of the user device 20 and/or connection state information of the charging port CP and the charger 200 and/or unlock signal reception information of the door D and/or unlock signal reception information of the charging door CD.

The controller 130 may include at least one memory in which a program for performing the above-described operation and the operation to be described later is stored, and at least one processor for executing the stored program. When there are a plurality of memories and processors, they may be integrated on one chip or may be provided in physically separate locations.

The sensors 140 may include at least one sensor that obtains information about a surrounding environment of the vehicle 10.

For example, the sensors 140 may include a front camera for obtaining front image data of the vehicle 10 and/or a side camera for obtaining side image data of the vehicle 10 and/or a rear camera for obtaining rear image data of the vehicle 10.

In addition, the sensors 140 may include a front radar for obtaining front radar data of the vehicle 10 and/or a side radar for obtaining side radar data of the vehicle 10 and/or a rear radar for obtaining rear radar data of the vehicle 10.

However, the type of sensor included in the sensors 140 is not limited to the sensor described above, and any sensor capable of obtaining information about the surrounding environment of the vehicle 10 may be employed without limitation.

That is, the sensors 140 may include various sensors such as an ultrasonic sensor and a Light Detection and Ranging (LiDAR) sensor.

The communicator 150 may include a communication circuit capable of transmitting and receiving communication signals to and from the user device 20 of the vehicle 10.

For example, the communicator 150 may communicate with the user device 20 using either an Ultra Wide Band (UWB) signal and/or a radio frequency (RF) signal.

The communicator 150 may include a transmitter for transmitting the communication signal (e.g., the UWB signal or the RF signal) to the user device 20 and a receiver for receiving the communication signal output from the user device 20.

The transmitter may include a transmission antenna for transmitting a communication signal and a reception antenna for receiving the communication signal.

The communicator 150 may transmit a request signal (e.g., a poll signal) to the user device 20 based on a control signal of the controller 130, and may establish communication with the user device 20 in response to receiving a response signal from the user device 20.

The controller 130 may receive the communication signal transmitted from the user device 20 through the communicator 150, and may determine the position of the user device 20 based on the communication signal transmitted from the user device 20.

The controller 130 may determine the position of the user device 20 based on various positioning algorithms. For example, the controller 130 may determine the position of the user device 20 based on a time difference of arrival (TDoA) of the communication signal, determine the position of the user device 20 based on a two way ranging (TWR) method, and determine the position of the user device 20 based on a strength of the communication signal received from the user device 20. In addition, the controller 130 may identify the position of the user device 20 using various positioning algorithms such as AoA (Angle of Arrival), Aod (Angle of Departure), ToA (Time of Arrival), ToF (Time of Flight), etc, and an algorithm for estimating the position of the user device 20 is not limited thereto.

When the communicator 150 includes a plurality of receivers, the controller 130 may determine exact coordinates of the user device 20 by using a triangulation method.

The user device 20 may refer to any configuration capable of controlling various components of the vehicle 10 through two-way communication with the vehicle 10. As an example, the user device 20 may include a smart key (e.g., a FOB key) or a digital key (e.g., a smartphone).

Hereinafter, for convenience of description, it is assumed that the user device 20 is the smart key.

A smart key 20 may transmit a signal for performing various functions, such as the lock signal of the door D, the unlock signal of the door D, and the unlock signal of the charging door CD, to the vehicle 10.

The head unit of the vehicle 10 may include the telematics terminal 160.

The telematics terminal 160 may communicate with an external terminal device to transmit various data and/or information and/or commands to the external terminal device, and may receive various data and/or information and/or commands from the external terminal device.

For this purpose, the telematics terminal 160 may be implemented using a communication chip, an antenna, and related components to access a wireless communication network. That is, the telematics terminal 160 may be implemented as various types of communication modules capable of long-distance communication with the external terminal device.

The user may access an external server (e.g., a telematics server) for managing the vehicle 10 using the external terminal device (e.g., the smartphone), and the telematics terminal 160 may receive information that the user has accessed an server from the external server.

That is, the telematics terminal 160 may establish communication with an external terminal through the wireless communication network.

The user may input a command to control various configurations of the vehicle 10 using a user interface of the external terminal device, and the telematics terminal 160 may transmit the command received from the external terminal device through the external server to various components of the vehicle 10.

For example, the user may input a command for turning on an ignition of the vehicle 10 using the user interface of the external terminal device, and the telematics terminal 160 may transmit the command for turning on the ignition to a starting system.

In response to establishing communication between the external terminal device and the telematics terminal 160 by the user accessing the external server (e.g., Blue Link server) for managing the vehicle 10 using the external terminal device, the IG3 power supply module may supply the power to the charging management system 120.

That is, the charging management system 120 may wake up by receiving power in response to establishing communication between the external terminal device of the user and the telematics terminal 160, and may output the electrical signal corresponding to the charging progress state of the vehicle 10.

The vehicle 10 may provide a reserved charging function.

As an example, the user may input a setting for reserved charging by using the head unit of the vehicle 10, and the charging management system 120 may determine a charging start time, a charging end time, etc. of the battery based on the setting for the reserved charging.

The reserved charging function may be a function in which the user sets a target charge amount, a scheduled departure time, a discount charging time, and the like, and charges the battery according to a charging schedule for the charging management system 120 to economically charge the battery.

For example, assuming that an electricity rate is discounted from 2 am to 5 am, and an estimated time required to fully charge the battery is 2 hours, the user connects the charger 200 to the charging port CP at 1 am, the battery is preferentially charged between 2 am and 5 am without being charged immediately.

That is, even if the charger 200 is connected to the charging port CP at 1 am, the charging management system 120 does not immediately proceed with charging, but may proceed with charging at 2 am, and may end charging at 4 am.

Hereinafter, the reserved charging function will be described in detail with reference to FIGS. 3 to 4, and an example of the electrical signal output from the charging management system 120 will be described.

Figure 3:
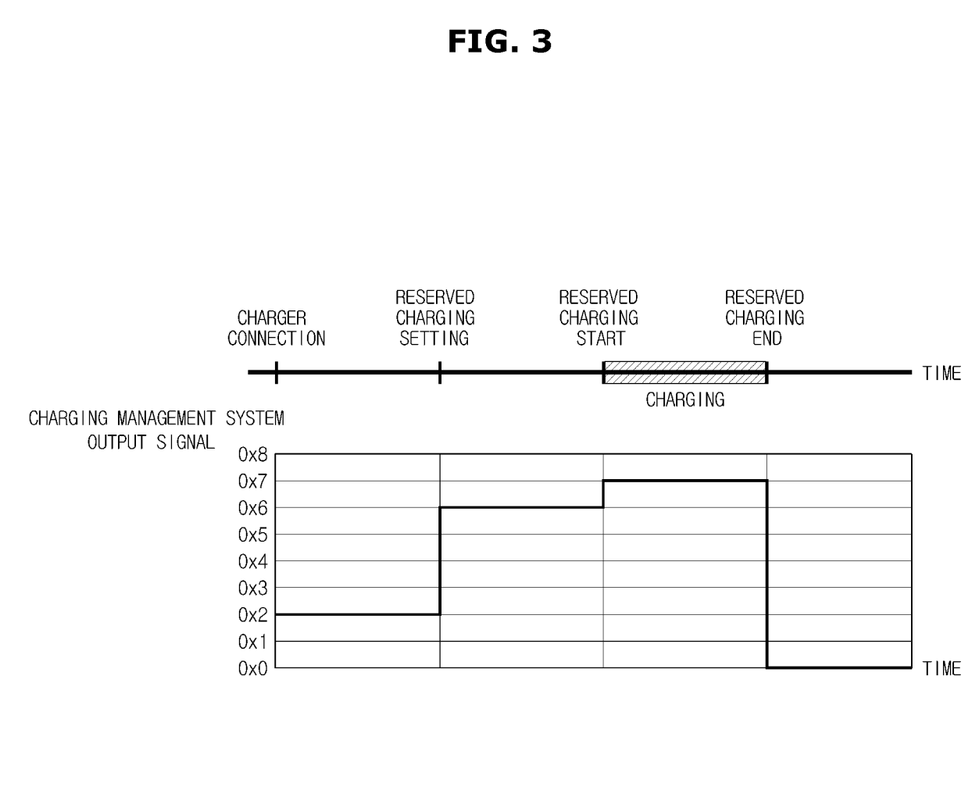
FIGS. 3 and 4 are examples of electrical signals output from a charging management system according to an embodiment.
Figure 4:
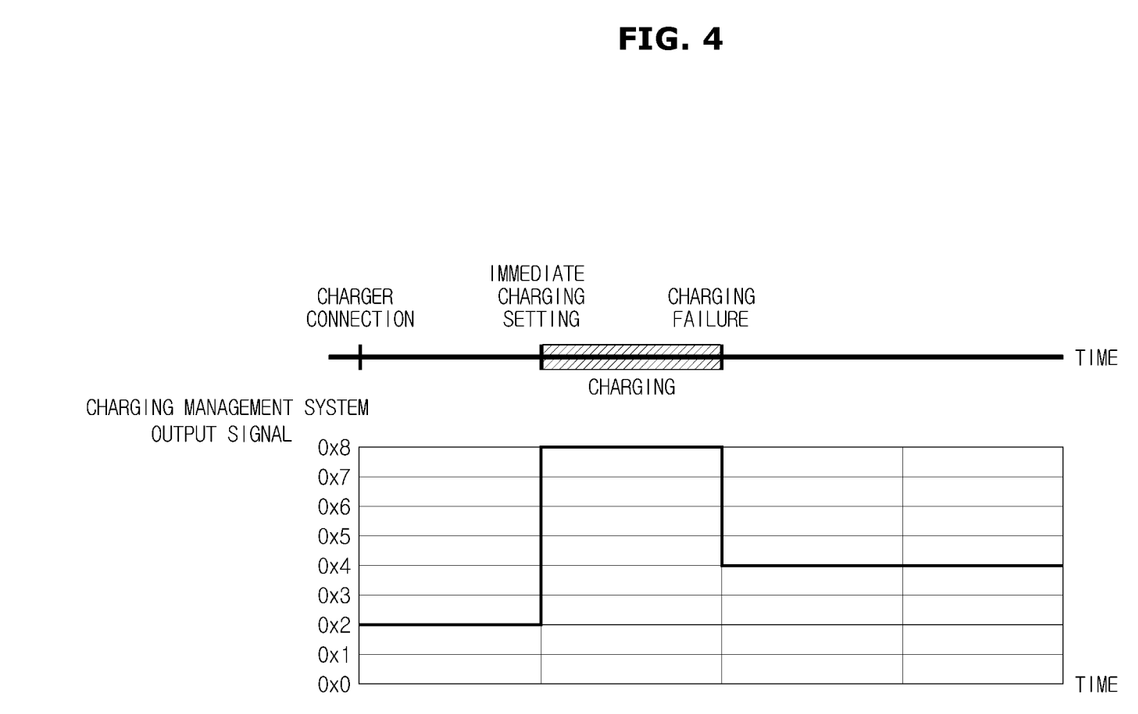

FIGS. 3 and 4 are examples of electrical signals output from a charging management system according to an embodiment.

In a case of FIGS. 3 and 4, although it is assumed that the charging management system 120 is always awake, a person skilled in an art may recognize that the charging management system 120 can output the electrical signal only in a state in which the IG3 power supply module supplies the power (IG3 state).

As described above, the charging management system 120 may output the electrical signal corresponding to the charging progress state of the vehicle 10, and may transmit it to the sound output system 110. The sound output system 110 may output the sound (hereinafter, 'charging guide sound') corresponding to the charging progress state of the vehicle 10.

The charging progress state of the vehicle 10 may refer to a current state of the vehicle 10 related to the charger 200.

For example, the charging progress state of the vehicle 10 may include at least one of 'charger connection state', 'charging start state', 'charging end state', 'reserved charging start state', 'reserved charging standby state' or 'charging failure state'.

The 'charger connection state' may refer to a state in which the charging port CP and the charger 200 are electrically connected, but may refer to a state in which the power is not supplied through the charger 200. The charging guide sound corresponding to the 'charger connection state' may be, for example, a voice saying "charger is connected."

The 'charging start state' may refer to a state in which the power is supplied through the charger 200 according to an immediate charging command while the charging port CP and the charger 200 are electrically connected. The charging guide sound corresponding to the 'charging start state' may be, for example, a voice saying "charging has started."

The 'charging end state' may refer to a state in which power supply through the charger 200 is normally terminated. The charging guide sound corresponding to the 'charging end state' may be, for example, a voice saying "charging has ended."

The 'reserved charging start state' may refer to a state in which the power is supplied through the charger 200 at a time of reserved charging. The charging guide sound corresponding to the 'reserved charging start state' may be, for example, a voice saying "reserved charging has started."

The 'reserved charging standby state' may refer to a state from a time when the reserved charging time is set before reaching the reserved charging time. The charging guide sound corresponding to the 'reserved charging standby state' may be, for example, a voice saying "reserved charging is on standby."

The 'charging failure state' may refer to a state in which the power supply through the charger 200 is abnormally terminated. The charging guide sound corresponding to the 'charging failure state' may be, for example, a voice saying "charging was abnormally terminated."

The above-described charging progress state and/or charging guide sound of the vehicle 10 is merely an example, and a type of the charging progress state and/or the charging guide sound of the vehicle 10 is not limited.

Referring to FIG. 3, the charging management system 120 may output an electrical signal (0x2) corresponding to the 'charger connection state' in response to the charger 200 being connected to the charging port CP.

When the user inputs the reserved charging command using the head unit, the charging management system 120 may output an electrical signal (0x6) corresponding to the 'reserved charging standby state' until the reserved charging starts.

The charging management system 120 may output an electrical signal (0x7) corresponding to the 'reserved charging start state' from a reserved charging start time to a reserved charging end time.

When the reserved charging end time is reached and the charging is terminated, the charging management system 120 may output an electrical signal (0x0) corresponding to the 'charging end state'.

Referring to FIG. 4, the charging management system 120 may output an electrical signal (0x8) corresponding to the 'charging start state' in response to an input of the immediate charging command. That is, electrical signals corresponding to the 'reserved charging start state' and an 'immediate charging start state' may be different from each other.

When the charging is terminated due to an abnormal reason during charging through the charger 200, the charging management system 120 may output an electrical signal (0x4) corresponding to the 'charging failure state'.

In this way, the charging management system 120 may output the electrical signal corresponding to the charging progress state of the vehicle 10 through the charger 200.

As described above, the sound output system 110 may output the sound corresponding to the electrical signal received from the charging management system 120.

More particularly, the sound output system 110 may output the sound corresponding to the electrical signal in response to detecting a rising edge or a falling edge of the electrical signal output from the charging management system 120.

This is because, when continuously receiving the electrical signal from the charging management system 120, continuously outputting the charging guide sound may become noise.

For example, the sound output system 110 may output a voice saying 'charger is connected' in response to detecting a rising edge of an electrical signal (0x2) corresponding to 'charger connection state'.

According to the embodiment, the IG3 power supply module may supply the power to the charging management system 120 for a preset time when the reserved charging time is imminent, and accordingly, the charging management system 120 may wake up when the reserved charging time is imminent and output the electrical signal (0x6) corresponding to the 'reserved charging standby state', and then output an electrical signal (0x7) corresponding to the 'reserved charging start state'.

Accordingly, the sound output system 110, in response to receiving the electrical signal (0x6) corresponding to the 'reserved charging standby state' from the charging management system 120, may output a voice saying "reserved charging is on standby", and may output the voice saying "reserved charging has started" in response to receiving the electrical signal (0x7) corresponding to the 'reserved charging start state'.

Assuming that the user is resting at home after setting 2:00 AM as the reserved charging start time and 4:00 AM as the reserved charging end time, the charging management system 120 may wake up when 2 am is imminent (e.g. 1:59 am) and output the electrical signal (0x6) corresponding to the 'reserved charging standby state'. Accordingly, the sound output system 110 may output the voice saying "reserved charging is on standby. In addition, the charging management system 120 may output the electrical signal (0x7) corresponding to the 'reserved charging start state' at 2 am, and accordingly, the sound output system 110 may output the voice saying "reserved charging has started."

In the above case, the sound output system 110 may output an unnecessary charging guide sound even though the user is resting at home. Accordingly, a pedestrian passing around the vehicle 10 may be startled by the charging guide sound output from the vehicle 10.

As another example, when the user accesses the Blue Link server through the external terminal device (e.g., the smartphone) at home and the communication between the telematics terminal 160 and the external terminal device is established, the vehicle 10 may enter the IG3 state. Accordingly, the wake-up charging management system 120 may output the electrical signal corresponding to the charging progress state of the current vehicle 10, and may output the charging guide sound unnecessarily from the sound output system 110.

As another example, when the user connects to the Blue Link server through the external terminal device (e.g., the smartphone) and remotely transmits the immediate charge command to the telematics terminal 160, the sound output system 110 may output the charging guide sound saying "charging has started" unnecessarily.

In the above, various components of the vehicle 10 have been described.

Hereinafter, a method of controlling the vehicle 10 capable of preventing unnecessary output of the charging guide sound will be described.

Figure 5:
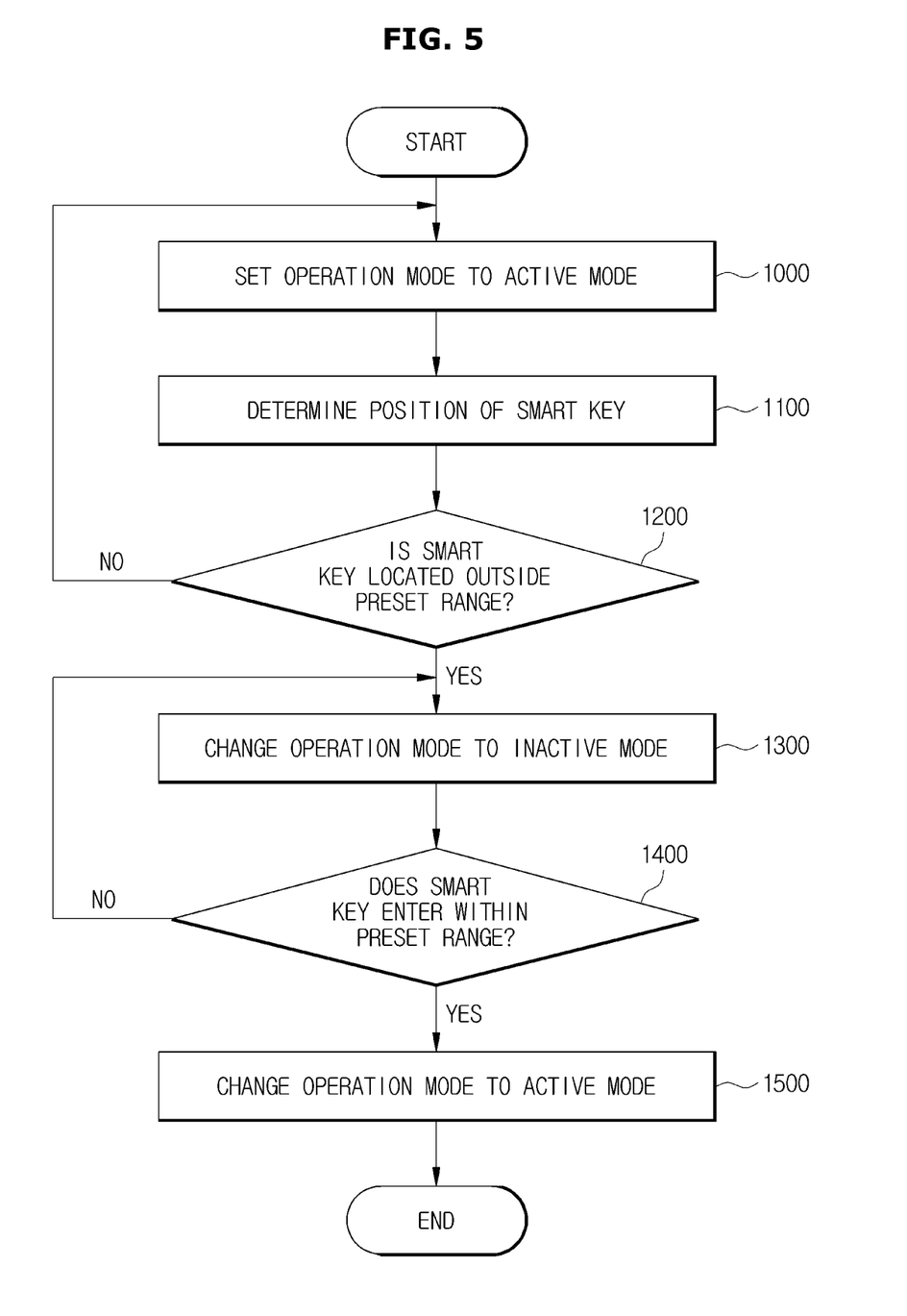
FIG. 5 is a flowchart of a method of controlling a vehicle according to an embodiment.
Figure 6:
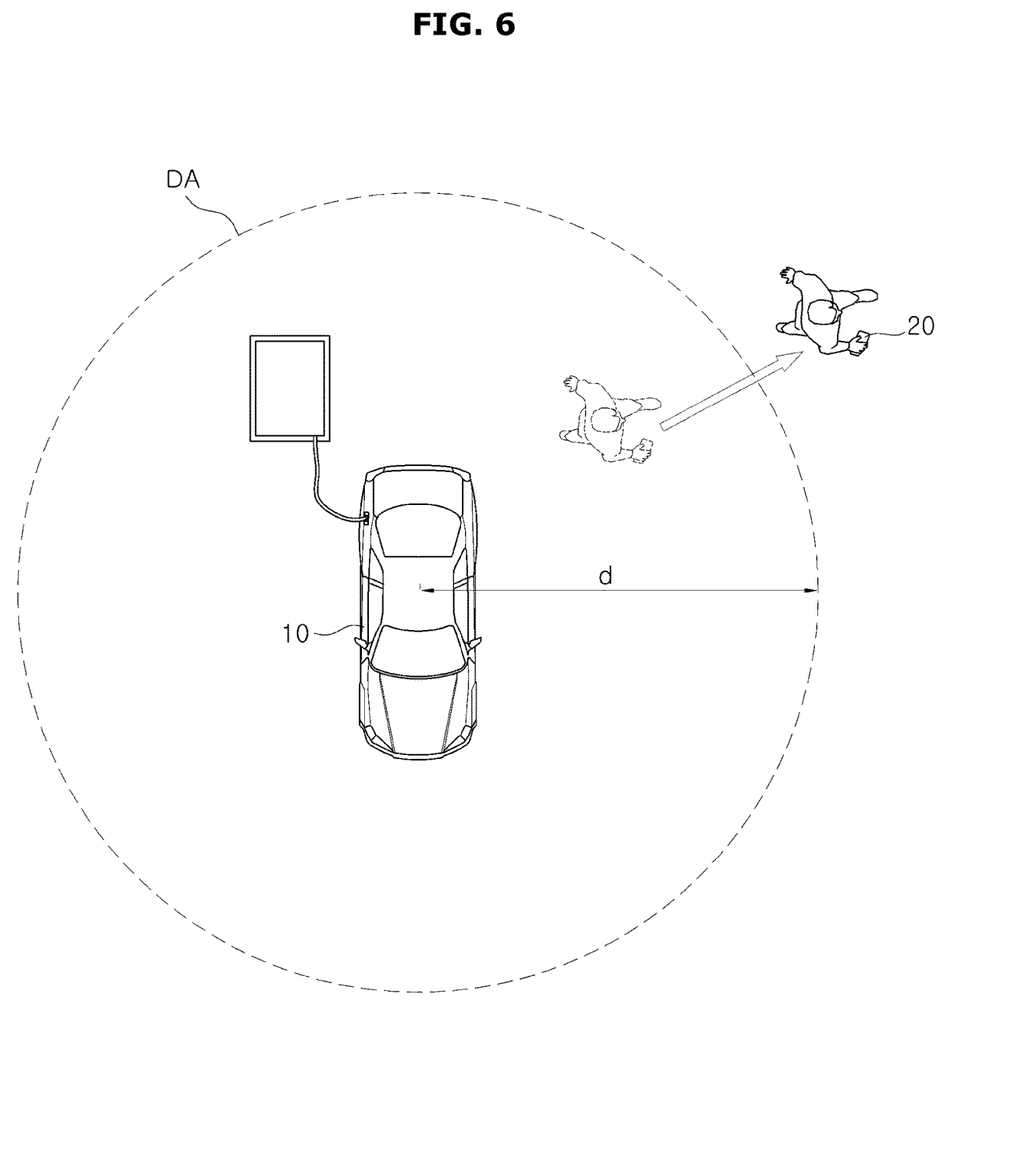
FIG. 6 is an example of a situation in which a sound output system is changed to an inactive mode according to an embodiment.
Figure 7:
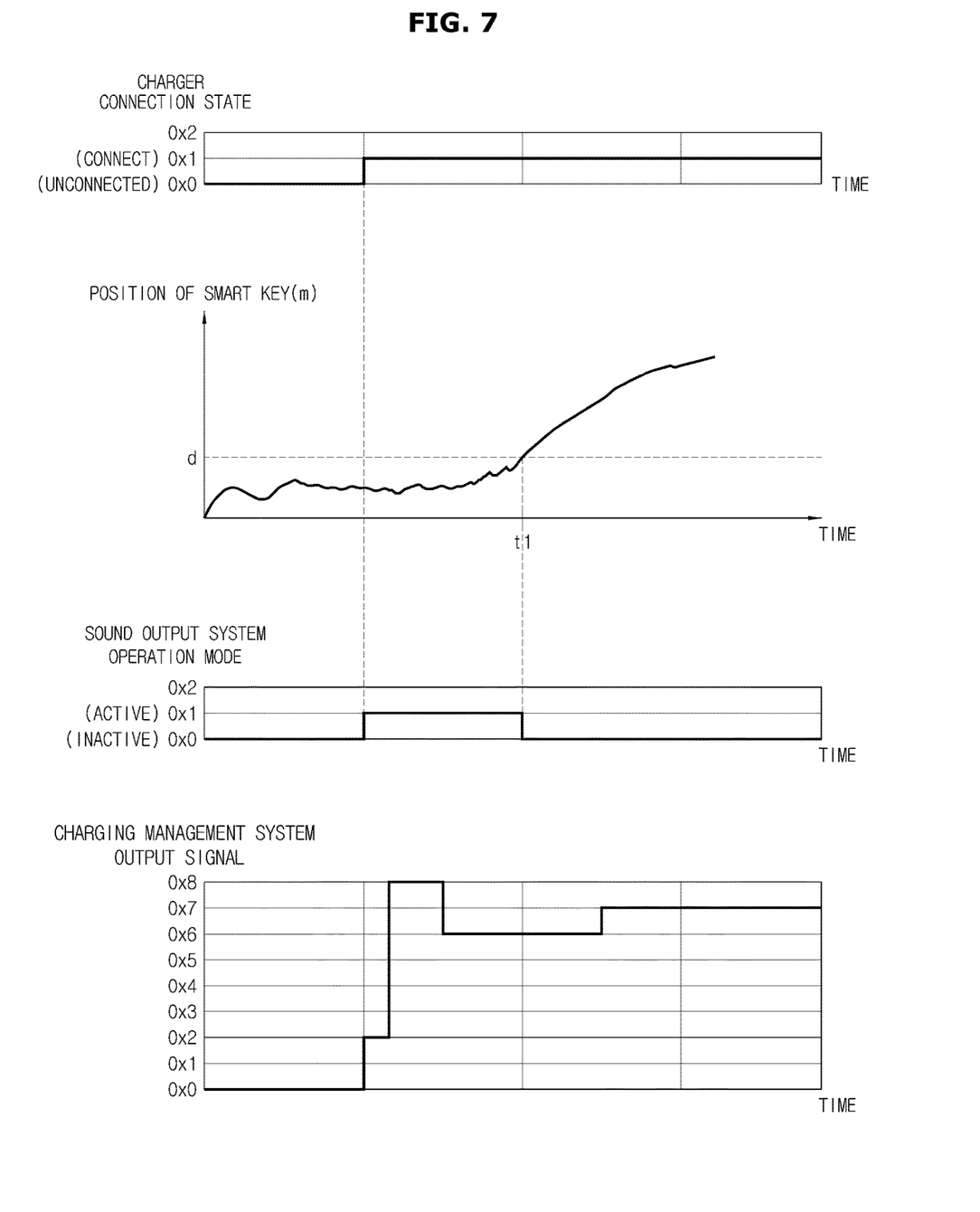
FIGS. 7 and 8 are views illustrating an operation mode of a sound output system according to a position of a user device and a connection state of a charger.
Figure 8:
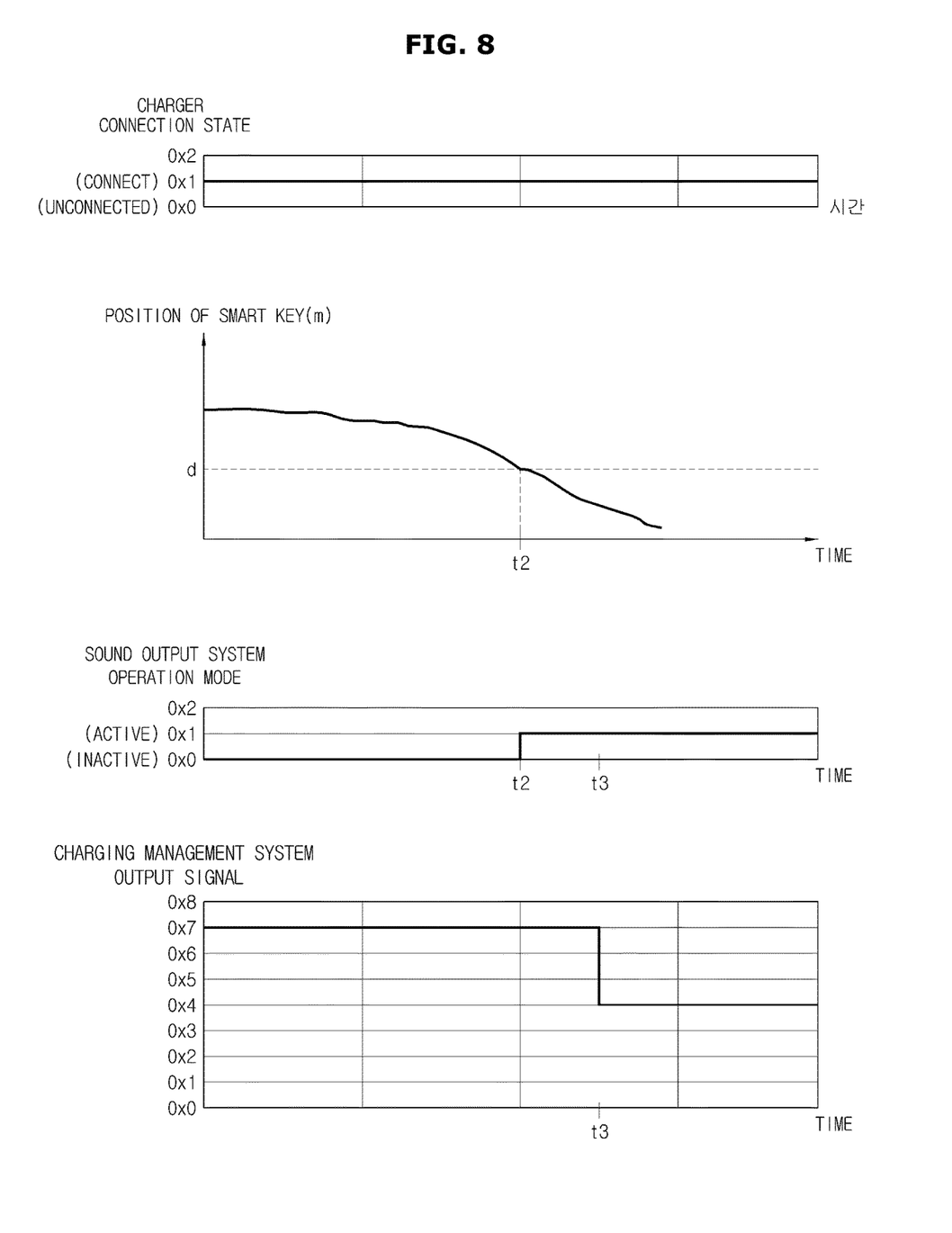

FIG. 5 is a flowchart of a method of controlling a vehicle according to an embodiment, FIG. 6 is an example of a situation in which a sound output system is changed to an inactive mode according to an embodiment, and FIGS. 7 and 8 are views illustrating an operation mode of a sound output system according to a position of a user device and a connection state of a charger.

Referring to FIG. 5, the controller 130 may set the operation mode of the sound output system 110 to the active mode when a preset condition related to the components of the vehicle 10 is satisfied (1000).

For example, the controller 130 may set the operation mode of the sound output system 110 to the active mode in response to the charger 200 being connected to the charging port CP.

This is because, when the charger 200 is connected to the charging port CP, it is necessary to control the sound output system 110 to inform the user of the charging progress state of the vehicle 10.

As another example, the controller 130 may set the operation mode of the sound output system 110 to the active mode in response to the detection of the unlock signal of the door D.

This is because, when the unlock signal of the door D is detected, a fact that the user is located in a vicinity of the vehicle 10 may be reliably estimated.

At this time, the unlock signal of the door D may include a wireless signal transmitted from the smart key 20.

As another example, the controller 130 may set the operation mode of the sound output system 110 to the active mode in response to the detection of the unlock signal of the charging door CD.

This is because a fact that the user will charge the vehicle 10 can be reliably estimated when the unlock signal of the charging door CD is detected.

The sound output system 110 operating in the active mode may receive an electrical signal (hereinafter, 'charging state signal') corresponding to the charging progress state of the vehicle 10 output from the charging management system 120, and may output the sound corresponding to a charging state signal.

The controller 130 may receive the communication signal transmitted from the smart key 20 through the communicator 150, and may determine the position of the smart key 20 based on the communication signal transmitted from the smart key 20 (1100).

Depending on the embodiment, determining the position of the smart key 20 may include calculating a distance between the vehicle 10 and the smart key 20, or may include determining the exact coordinates of the smart key 20.

The controller 130 may change the operation mode of the sound output system 110 to the inactive mode when the smart key 20 is located outside a preset range (YES in 1200) (1300).

Referring to FIG. 6, a situation in which the user walks outside a preset range DA while holding the smart key 20 after connecting the vehicle 10 to the charger 200 may be identified.

According to the embodiment, the positioning of the smart key 20 outside the preset range DA may include that the distance between the vehicle 10 and the smart key 20 is equal to or greater than a preset distance d, or may include that the coordinates of the smart key 20 are outside the preset coordinate range DA.

That is, when the user is out of the preset range, since the sound output system 110 does not need to output the charging guide sound, the controller 130 may change the operation mode of the sound output system 110 to the inactive mode.

Referring to FIG. 7, a relationship between the connection state of the charger 200, the position of the smart key 20, and the operation mode of the sound output system 110 may be identified.

According to the embodiment, the controller 130 may change the operation mode of the sound output system 110 to the active mode in response to the detection of the unlock signal of the door D or the unlock signal of the charging door CD. For convenience of explanation, it is assumed that the controller 130 changes the operation mode of the sound output system 110 according to the connection state of the charger 200.

The controller 130 may set the operation mode of the sound output system 110 to the active mode in response to the charger 200 being connected to the charging port CP of the vehicle 10.

The sound output system 110 operating in the active mode may output the charging guide sound corresponding to the charging state signal received from the charging management system 120.

For example, the sound output system 110 may output the charging guide sound saying "charger is connected" in response to receiving the electrical signal (0x2) corresponding to the charger connection state in the active mode.

Thereafter, the sound output system 110 may output the charging guide sound saying "charging has started" in response to receiving the electrical signal (0x8) corresponding to the charging start state in the active mode.

When the charging progress state of the vehicle 10 is switched from the charging start state to the reserved charging standby state, the sound output system 110 may output the charging guide sound saying "reserved charging is on standby" in response to receiving the electrical signal (0x6) corresponding to the reserved charging standby state in the active mode.

At this time, the user may leave the preset range DA at a specific time t1 while holding the smart key 20.

That is, the distance between the smart key 20 and the vehicle 10 at the specific time t1 may be greater than or equal to the preset distance d.

The controller 130 may change the operation mode of the sound output system 110 to the inactive mode in response to the smart key 20 being out of the preset range DA at the specific time t1.

After the specific time t1, even if the reserved charging is executed, the charging progress state of the vehicle 10 is switched to the reserved charging start state. Even if the charging management system 120 transmits the electrical signal (0x7) corresponding to the reserved charging start state, the sound output system 110 operating in the inactive mode may not output the charging guide sound.

In addition, when the user connects to the external server (e.g., Blue Link server) through the external terminal device (e.g., the smartphone) and establishes communication with the telematics terminal 160, the power of the IG3 power supply module may be turned on. Accordingly, even if the charging management system 120 outputs the charging state signal, the sound output system 110 operating in the inactive mode may not output the charging guide sound.

As such, according to the vehicle 10 and the method of controlling the vehicle 10, it is possible to prevent the unnecessary charging guide sound output by determining whether to output the charging guide sound according to the position of the smart key 20.

On the other hand, in order to determine the position of the smart key 20, there is a problem that the transmitter of the communicator 150 must continuously transmit the request signal for requesting the response signal to the smart key 20.

When the communicator 150 continuously transmits the request signal, unnecessary power may be continuously consumed.

Accordingly, the controller 130 may control the communicator 150 to communicate with the smart key 20 in response to detecting an object in the vicinity of the vehicle 10 through at least one sensor included in the sensors 140.

That is, the controller 130 may communicate with the smart key 20 only when a specific object is detected in the vicinity of the vehicle 10 through the sensors 140.

Referring back to FIG. 5, the controller 130 may change the operation mode of the sound output system 110 to the active mode when the smart key 20 enters within the preset range DA (YES in 1400) (1500).

This is because, when the smart key 20 re-enters within the preset range DA, a fact that the user is in the vicinity of the vehicle 10 can be reliably estimated.

According to the embodiment, the controller 130 may change the operation mode of the sound output system 110 to the active mode even when receiving the unlock signal of the door D from the smart key 20.

Referring to FIG. 8, when the user approaches the vehicle 10 while holding the smart key 20, it can be identified that the smart key 20 has entered (i.e., is located within) the preset range DA at a specific time t2.

The controller 130 may change the operation mode of the sound output system 110 to the active mode in response to the smart key 20 entering within the preset range DA, and accordingly the sound output system 110 may output the charging guide sound corresponding to the charging state signal.

The sound output system 110 may output the sound corresponding to the electrical signal output from the charging management system 120 in response to the change from the inactive mode to the active mode.

Since the user approaching the vehicle 10 is curious about the charging progress state of the vehicle 10, the user will want to hear the charging progress state of the vehicle 10 acoustically. Accordingly, the sound output system 110 may output the charging guide sound at the time t2 when the operation mode is changed from the inactive mode to the active mode.

For example, when the sound output system 110 receives the charging state signal (0x7) output from the charging management system 120 at the time t2 when the operation mode is changed from the inactive mode to the active mode, it may output the charging guide sound saying "charging is in progress."

The user approaching the vehicle 10 may easily determine the charging state of the vehicle 10 according to the charging guide sound.

When the charging progress state of the vehicle 10 is changed from the reserved charging progress state to the charging failure state at a specific time t3, the charging management system 120 may output the electrical signal (0x4) corresponding to the charging failure state, and the sound output system 110 may output the sound corresponding to the electrical signal (0x4) corresponding to the charging failure state.

Thereafter, the controller 130 may change the operation mode of the sound output system 110 to the inactive mode in response to the disconnection between the charger 200 and the charging port CP.

In addition, according to the embodiment, the operation mode of the sound output system 110 may be changed to the inactive mode in response to the charging door CD being closed. The operation mode of the sound output system 110 may be changed to the inactive mode in response to the detection of the lock signal of the door D.

On the other hand, when the sound output system 110 includes the virtual engine sound system, the virtual engine sound system may maintain the active mode for outputting the virtual engine sound.

According to the disclosure, after the user turns off the ignition, comes out of the vehicle 10 and connects the charger 200 to the vehicle 10, the sound output system 110 may not output the charging guide sound even if it is connected to the telematics server (e.g., Blue Link) interlocked with the vehicle 10 using the smartphone at a position far away from the vehicle 10.

Also, when the user is in the position far away from the vehicle 10, the sound output system 110 may not output the charging guide sound even if the reserved charging time of the vehicle 10 arrives.

As such, according to the disclosure, it is possible to prevent a situation in which the unnecessary charging guide sound is output, thereby preventing unnecessary noise generated in the vehicle 10.

According to the embodiments of the disclosure, it is possible to prevent unnecessary noise from being generated by outputting the sound for guiding the charging progress state only when the user can hear the sound output from the vehicle.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
a charging management system configured to output an electrical signal corresponding to a charging progress state of the vehicle;
a sound output system configured to output a sound indicating the charging progress state of the vehicle in response to the electrical signal being output from the charging management system in an active mode and not output the sound in an inactive mode, the sound including at least a voice indication of the charging progress state; and
a controller configured to determine a position of a user device based on a communication signal transmitted from the user device, and to change an operation mode of the sound output system to the inactive mode based on the user device being located outside a preset range such that the sound output system does not output the sound indicating the charging progress state of the vehicle in response to the electrical signal being output from the charging management system.

2. The vehicle according to claim 1, wherein the charging progress state comprises at least one of a charger connection state, a charging start state, a charging end state, a reserved charging start state, a reserved charging standby state, or a charging failure state.

3. The vehicle according to claim 1, wherein based on a charger being connected to a charging port of the vehicle, the controller is configured to set the operation mode of the sound output system to the active mode.

4. The vehicle according to claim 1, wherein based on a detection of an unlock signal of a door, the controller is configured to set the operation mode of the sound output system to the active mode.

5. The vehicle according to claim 1, wherein based on detecting an unlock signal of a charging door, the controller is configured to set the operation mode of the sound output system to the active mode.

6. The vehicle according to claim 1, wherein based on the user device being located within a preset range, the controller is configured to change the operation mode of the sound output system to the active mode.

7. The vehicle according to claim 1, further comprising:
a sensor configured to obtain information about a surrounding environment of the vehicle,
wherein based on detecting an object in a vicinity of the vehicle through the sensor, the controller is configured to communicate with the user device.

8. The vehicle according to claim 1, wherein based on changing from the inactive mode to the active mode, the sound output system is configured to output the sound corresponding to the electrical signal output from the charging management system.

9. The vehicle according to claim 1, further comprising:
a telematics terminal,
wherein the charging management system is configured to output the electrical signal corresponding to the charging progress state of the vehicle based on establishing a communication between the external terminal device and the telematics terminal.

10. A method of controlling a vehicle, the vehicle including a charging management system configured to output an electrical signal corresponding to a charging progress state of the vehicle, and a sound output system configured to output a sound indicating the charging progress state of the vehicle in response to the electrical signal being output from the charging management system in an active mode and not output the sound in an inactive mode, the method comprising:
determining, by a controller, a position of a user device based on a communication signal transmitted from the user device; and
changing, by the controller, an operation mode of the sound output system to the inactive mode based on the user device being located outside a preset range such that the sound output system does not output the sound indicating the charging progress state of the vehicle in response to the electrical signal being output from the charging management system,
wherein the sound includes at least a voice indication of the charging progress state.

11. The method according to claim 10, wherein the charging progress state comprises at least one of a charger connection state, a charging start state, a charging end state, a reserved charging start state, a reserved charging standby state, or a charging failure state.

12. The method according to claim 10, further comprising:
based on a charger being connected to a charging port of the vehicle, setting, by the controller, the operation mode of the sound output system to the active mode.

13. The method according to claim 10, further comprising:
based on a detection of an unlock signal of a door, setting, by the controller, the operation mode of the sound output system to the active mode.

14. The method according to claim 10, further comprising:
based on detecting an unlock signal of a charging door, setting, by the controller, the operation mode of the sound output system to the active mode.

15. The method according to claim 10, further comprising:
based on the user device being located within a preset range, changing, by the controller, the operation mode of the sound output system to the active mode.

16. The method according to claim 10, further comprising:
based on detecting an object in a vicinity of the vehicle, communicating, by the controller, with the user device.

17. The method according to claim 10, further comprising:
based on detecting a rising edge or a falling edge of the electrical signal output from the charging management system in the active mode, outputting, by the sound output system, the sound corresponding to the electrical signal.

18. The method according to claim 10, further comprising:
based on changing from the inactive mode to the active mode, outputting, by the sound output system, the sound corresponding to the electrical signal output from the charging management system.

19. The method according to claim 10, further comprising:
   outputting, by the charging management system, the electrical signal corresponding to the charging progress state of the vehicle based on establishing a communication between the external terminal device and the telematics terminal.

20. A vehicle comprising:
   a charging management system configured to output an electrical signal corresponding to a charging progress state of the vehicle;
   a sound output system configured to output a sound indicating the charging progress state of the vehicle in response to the electrical signal being output from the charging management system in an active mode and not output the sound in an inactive mode; and
   a controller configured to determine a position of a user device based on a communication signal transmitted from the user device, and to change an operation mode of the sound output system to the inactive mode based on the user device being located outside a preset range such that the sound output system does not output the sound indicating the charging progress state of the vehicle in response to the electrical signal being output from the charging management system,
   wherein based on detecting a rising edge or a falling edge of the electrical signal output from the charging management system, the sound output system is configured to output the sound corresponding to the electrical signal.

\* \* \* \* \*